United States Patent
Rivas et al.

[11] Patent Number: 5,603,674
[45] Date of Patent: Feb. 18, 1997

[54] SET OF MOTOR VEHICLE CONTROLS FOR THE ASSISTANCE OF INVALID DRIVERS

[76] Inventors: Francisco Rivas, 9 Imp. de la Résistance, Bruguières, F31150, France; Michel Santa-Lucia, Chemin de Borde-Blanche, Brax, F-31490, France

[21] Appl. No.: 307,785
[22] PCT Filed: Apr. 5, 1993
[86] PCT No.: PCT/FR93/00342
§ 371 Date: Sep. 29, 1994
§ 102(e) Date: Sep. 29, 1994
[87] PCT Pub. No.: WO93/19948
PCT Pub. Date: Oct. 14, 1993

[30] Foreign Application Priority Data

Apr. 7, 1992 [FR] France .................................. 92 04333
Apr. 2, 1993 [FR] France .................................. 93 04086

[51] Int. Cl.$^6$ .......................... B60K 41/20; B60K 41/24; G05G 11/00
[52] U.S. Cl. .......................... 477/170; 180/321; 180/333; 74/481; 74/482; 74/484 R; 74/523
[58] Field of Search .................. 477/170, 172, 477/173, 180, 209; 74/481, 482, 484 R, 523; 180/320, 321, 323, 326, 333; 192/3.662, 9, 4 A

[56] References Cited

U.S. PATENT DOCUMENTS

| | | | |
|---|---|---|---|
| 2,082,430 | 6/1937 | Townsend | 477/170 X |
| 2,245,958 | 6/1941 | Barr et al. | 192/3 |
| 2,470,273 | 5/1949 | Von Uffel | 74/481 X |
| 2,964,965 | 12/1960 | Hanson | 74/481 |
| 3,000,475 | 9/1961 | Arpin | 74/482 X |
| 3,192,794 | 7/1965 | Coonts | 74/481 |
| 3,877,318 | 4/1975 | Castol | 74/481 |
| 5,012,689 | 5/1991 | Smith | 74/481 X |

Primary Examiner—Charles A. Marmor
Assistant Examiner—Saul Rodriquer
Attorney, Agent, or Firm—Greenblum & Bernstein P.L.C.

[57] ABSTRACT

A set of motor vehicle controls for the assistance of invalid drivers, especially those handicapped in the lower limbs, is provided. The system includes a set of controls mounted on the steering wheel for operating the accelerator and the brake, a set of controls mounted on the gear shaft lever for operating the clutch and brake, a set of motors controlling the position of each of the brake, clutch, and accelerator, at least one member transmitting commands to all controls by one of a wire control system and wire-free control system, at least one unit transmitting from each of the motors to the corresponding pedal, and an electronic unit controlling the motors. The system may be employed in any motor vehicle with a mechanical or automatic gear box.

15 Claims, 11 Drawing Sheets

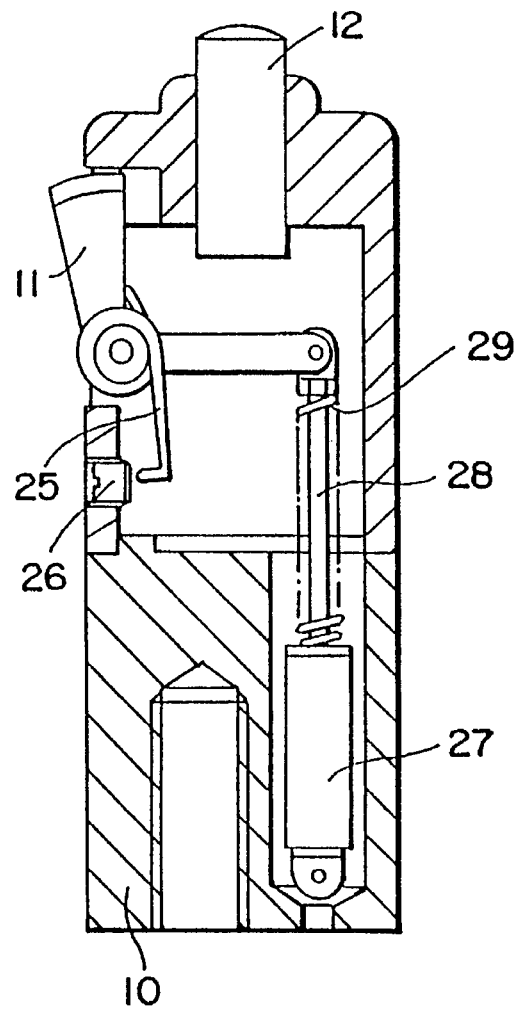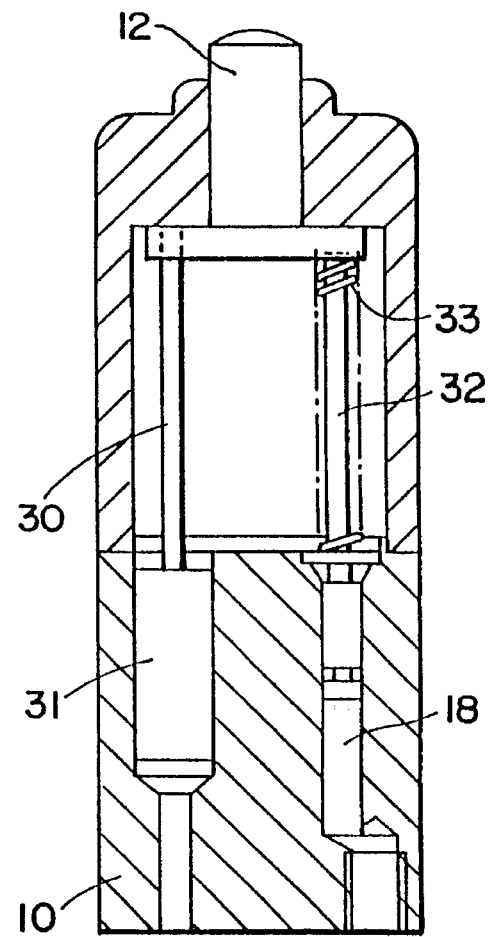
Fig - 6
Fig - 7

SET OF MOTOR VEHICLE CONTROLS FOR THE ASSISTANCE OF INVALID DRIVERS

The object of the present invention is a set of motor vehicle controls for the assistance of invalid drivers in driving said vehicles, especially persons handicapped in the lower limbs.

Most known systems are designed to be adapted to vehicles provided with an automatic gear box, which substantially increases the cost of the equipped vehicle and restricts the choice of models and even makes.

The object of the invention is to provide a system which can be easily adapted to cars with a mechanical gear box and pedal assembly, without altering the structural elements.

Another object of the invention is to provide a system which is modular and can therefore equip both vehicles with a mechanical gear box as well as vehicles with an automatic gear box.

Another object of the invention is to provide a system which allows the invalid user to experience sensations identical to those of driving a normal vehicle.

The invention also aims to provide a system that allows all the flexibility and performance of the vehicle to be maintained, and which enables normal driving with pedals by a non-invalid person, or driving by an invalid, which makes the thusly equipped vehicle universal.

To this end, the system according to the invention is essentially characterized in that it comprises:

- a first set of controls on the steering wheel for the accelerator and the brake,
- a second set of controls independent of the steering wheel, for example on the protective cover of the gear shift lever for the clutch and the brake,
- a set of electrical, hydraulic, pneumatic or equivalent motors, each respectively controlling one of the pedals of the pedal assembly or any other element enabling control,
- at least one member transmitting commands given by the set of steering wheel controls,
- at least one member receiving said commands,
- an electronic unit controlling the motors.

The command transmitting members can be wired or be of any known wire-free type.

According to yet another arrangement of the invention, the set of motors thereof comprises as many motors as there are pedals in the pedal assembly, or elements to be actuated.

According to yet another characteristic of the invention, the second set of controls is mounted on the protective cover of the gear shift lever and comprises a clutch control trigger and a brake control button, said triggers and button being connected to the electronic unit controlling the motors by any wired or wire-free means.

According to another characteristic of the invention, the set of steering wheel controls for the accelerator and the brake is constituted:

- of at least one position sensor mounted on the steering wheel to control the accelerator,
- of at least one position sensor mounted on the steering wheel to control the brake,
- of at least one radio-transmitting member which receives the commands from the sensors, and at least one radio-receiving member in connection with the electronic control circuit which transmits the commands to the motor concerned.

According to another characteristic of the invention, the steering wheel is equipped with a rotating internal hoop bearing two concentric annular sensors, one for the accelerator, and one for the brake. This rotation of the hoop with respect to the steering wheel and vice versa enables the driver to maneuver the steering wheel and maintain contact with the sensors.

Other characteristics and advantages of the invention will become apparent upon reading the following description of an embodiment of the invention, provided as a non-limiting example and illustrated by the attached drawings wherein:

FIGS. 1A–D are schematic representations of the system according to the invention, FIG. 2 is a view of the set of controls at the steering wheel, FIGS. 3–4–5 are views along sections AA–BB and CC of FIG. 2, FIG. 6 is a sectional view of the protective cover of the gear shift lever with brake and clutch control, FIG. 7 is another sectional view of the protective cover of the gear shift lever according to FIG. 6, FIG. 8 is a top view of the steering wheel according to a new embodiment of the invention, FIGS. 9 and 10 are partial views of the steering wheel according to FIG. 8, FIGS. 11, 12, 13 and 14 represent a pedal assembly protection device, FIG. 15 represents a sectional view of an embodiment of the controls at the protective cover of the gear shift lever.

As represented in FIG. 1, the system according to the invention comprises a first set of controls for the accelerator and the brake on steering wheel 1.

Accelerator control 2 is constituted by a hoop 3 (FIG. 3) of a smaller diameter than the steering wheel, and which is mounted inside the latter.

A flexible hose, connected to a pressure sensor, is mounted on hoop 3.

The brake control is constituted of two push-buttons 5 which actuate the proportionate force or stroke pressure sensors.

The push-buttons are arranged on the upper portion of the steering wheel with respect to its horizontal diameter and on either side of its vertical diameter.

The information from the hose sensors for the accelerator and the push-buttons for the brake are transmitted to a transmitting member 6 borne by and inside of hoop 3.

The sensors used are of the inductive type whose transmitted pulses are a function of the degree of depression of the control as will be described later.

These pulses are transmitted by the wire-free transmitting member from the steering wheel to the receiving member of an electronic control unit 7.

It is understood that without departing from the scope of the invention, the transmission of commands or pulses can be carried out by wire-free means, transmitters or teletransmitters of any known type, or by wired means.

Electronic control unit 7 is connected to the ignition coil or to any other source providing motor functioning information. This unit is connected to each of motors 8 by a wired system 9.

On the protective cover of gear shift lever 10 are mounted a clutch control constituted by a trigger 11 actuating a non-represented proportionate force or stroke pressure sensor, and a brake control 12 constituted of a button also actuating a non-represented pressure sensor.

The control and command signals 11–12 of the corresponding sensors are transmitted to the electronic control unit by a wired or wire-free system 13 as mentioned above.

Each of motors 8 comprises a positioned electronic servomotor, a reducing gear and a winch 14.

Each of winches 14 actuates a sheathed cable 15 which is connected by a return pulley 16 to the corresponding pedal 17 whose depression it will determine.

The motor being understood as any motor system of the known type, electric, pneumatic or hydraulic, for example, which can actuate members transmitting the commands received at the pedals.

Electronic control unit 7 is used to transform the information from the various sensors—from the steering wheel or the protective cover of the gear shift lever—into modulated electrical power enabling the motor to attain and retain the desired position. This automatic control system functions as a closed loop: each motor is provided with a position sensor which sends information relating to its position to the control unit, this prevents positional errors and allows an optimum positional accuracy of each pedal 16 to be obtained.

The electronic control unit has the function of managing the control priorities.

The motor group obeys the most depressed sensor. As regards the clutch, it obeys the motor regimen when the latter is less than a given value.

This enables a distinction between the sensors on the one hand, and greater safety on the other.

All the parameters, such as resting position, maximum stroke and motor functioning, can be adjusted from the control unit in order to be suitable for any type of pedal.

The electronic control unit can be housed in the engine compartment of the vehicle or any desired location, and the set of motors 8 can be arranged in any section of the passenger space, under the seat or under the dashboard, for example.

Each of the brake and clutch sensors of steering wheel 5 or of protective cover of gear shift lever 10 is equipped with a device allowing variation in the depression resistance.

Brake control 5 on the steering wheel (FIG. 6) is provided with a doubly-stiff spring which enables the driver to feel the braking.

Brake control 12 on the protective cover of the gear shift lever (FIGS. 1–6–7) is connected to the master cylinder by means of a conduit 17 with a force attenuator which generates a pressure transmitted to a micro-jack 18 in order to obtain a tightening of the control in proportion to the emergency braking by steering wheel controls 5.

Electronic control unit 7 automatically actuates the clutch as soon as the vehicle's engine attains a rotational speed of less than a given value, comprised between 1,000 to 2,000 rpm, for example, which prevents the engine from getting stalled upon completion of braking and allows comfortable and safe maneuvering.

The trigger of clutch 11 is equipped (FIG. 6) with a double-spring enabling the clutching point to be materialized.

Consequently, for the user, the clutch is slack upon depression until clutching begins, whereupon the clutch is tighter; upon release, the trigger is initially easy to release, due to the action of the tight spring, then becomes less easy, due to the action of the slack spring; this is when the clutch engages and the user can control slipping.

An adjustment system, using screws for example, enables the determination of the point of change in the tightness of depression of the control.

The set of accelerator and brake controls is fixed to the steering wheel as shown in FIGS. 2–3–4 and 5.

Hoop 3, which receives accelerator control flange 2, is provided with three supports for example, arranged at 120° with respect to one another.

Said supports each comprise an arched wall 19 which presses against the inside of the steering wheel and whose position and locking are adjustable by means of a screw 20.

One of the supports receives transmitting box 6 and each of the two others receives a braking control 5.

In FIG. 2, hoop 3 is represented receiving the steering wheel controls.

Figure 1:
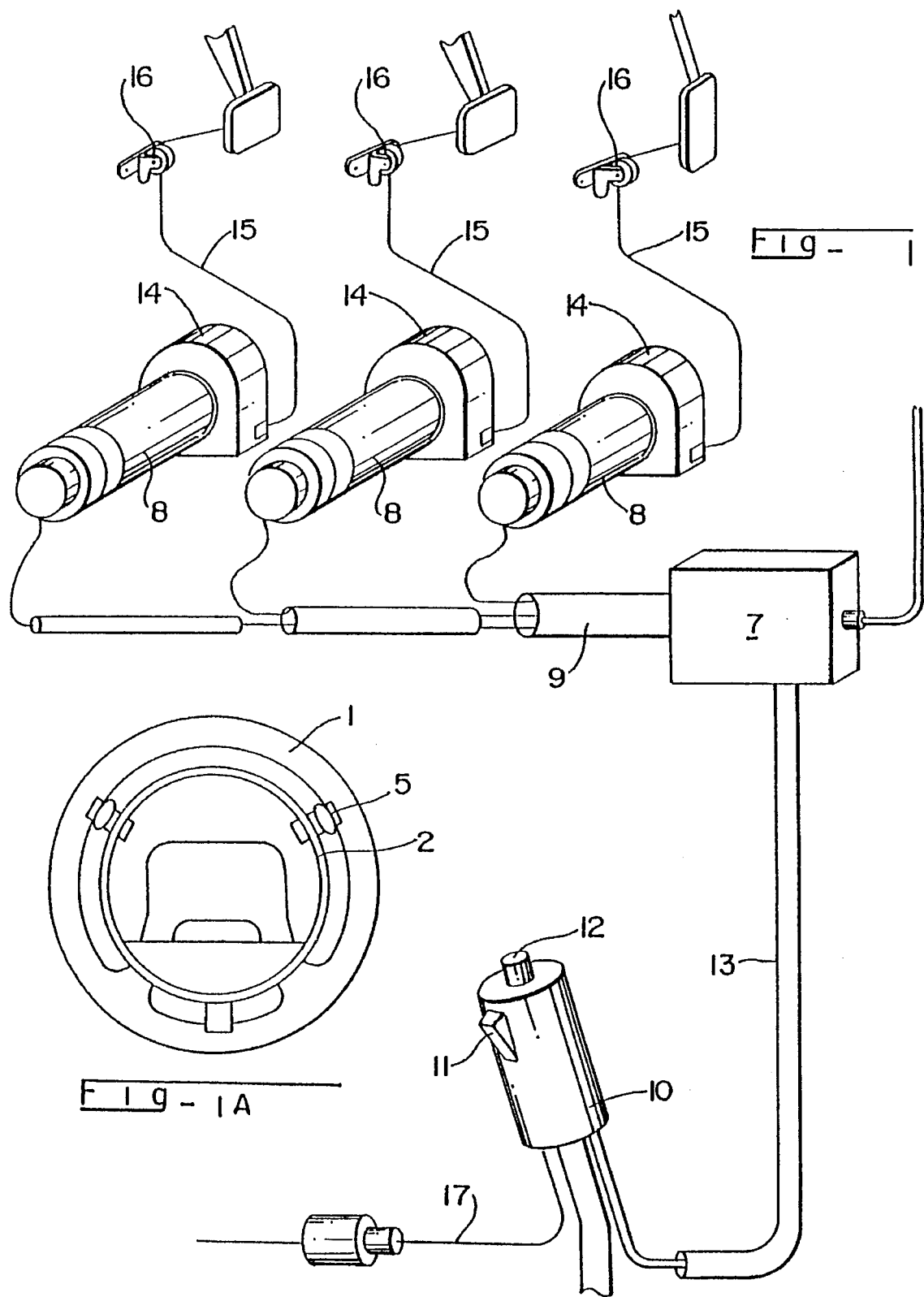
Figure 2:
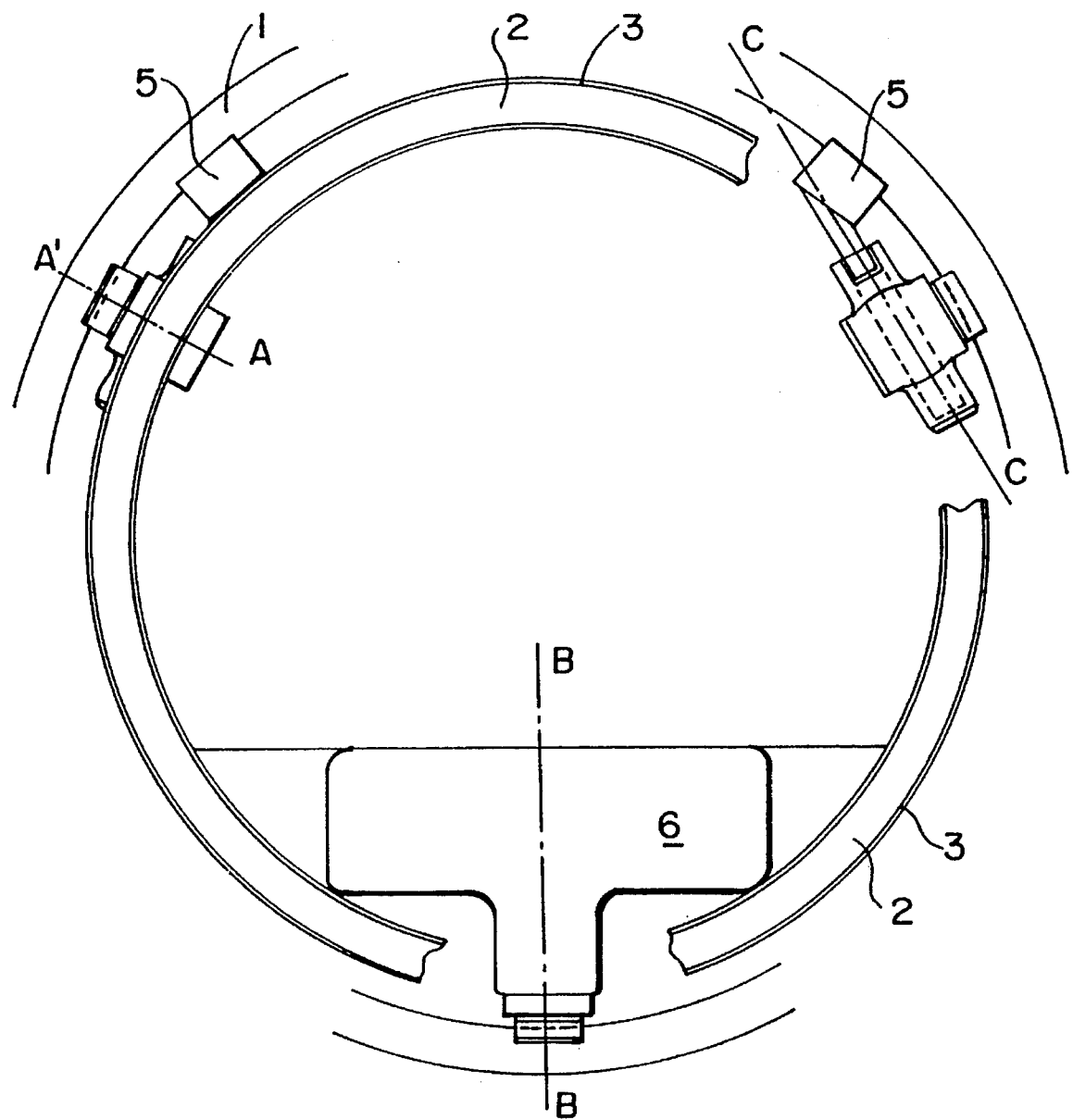
Figure 3:
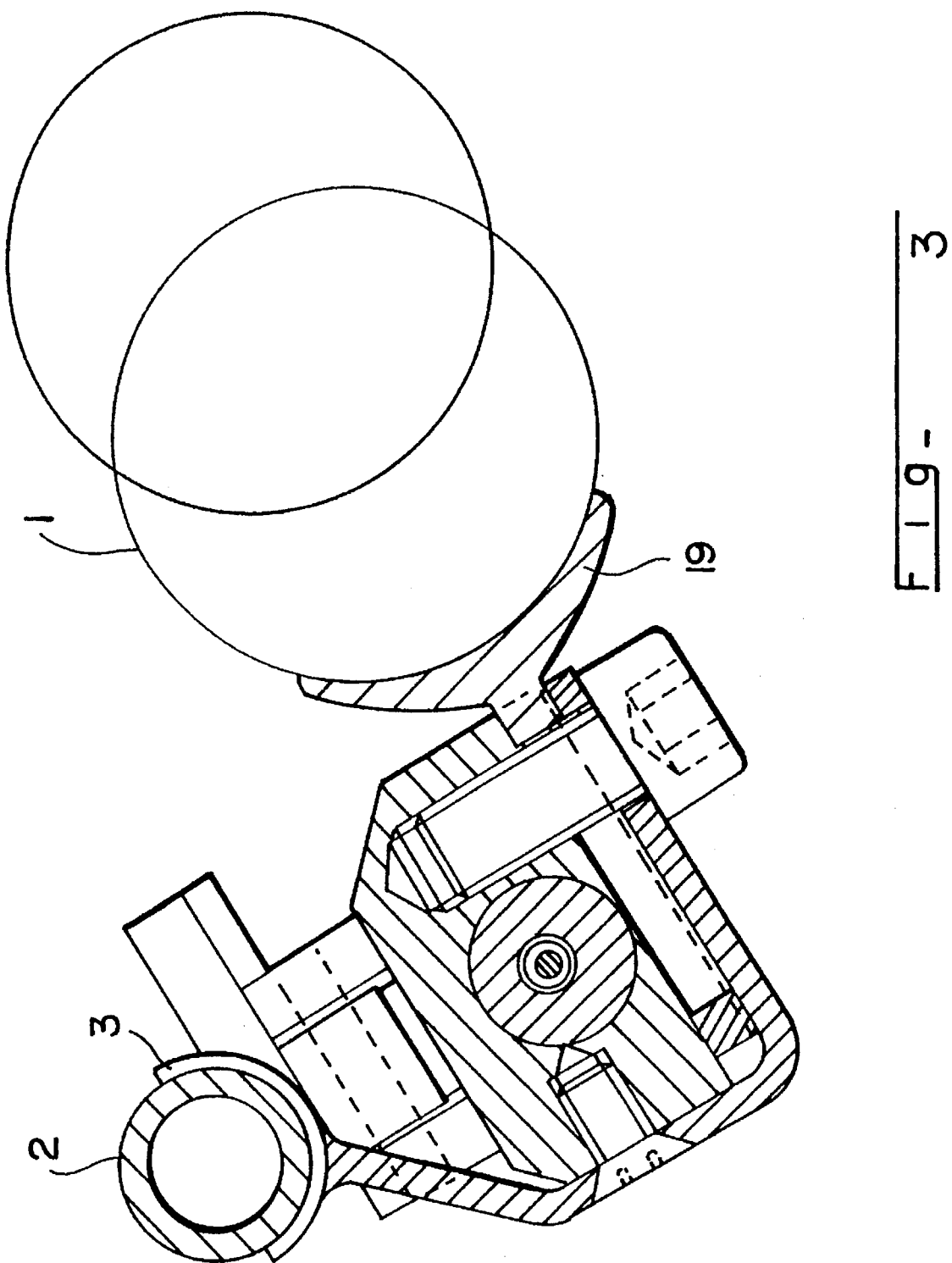
FIG. 3 represents a view along section AA of FIG. 2.
Figure 4:
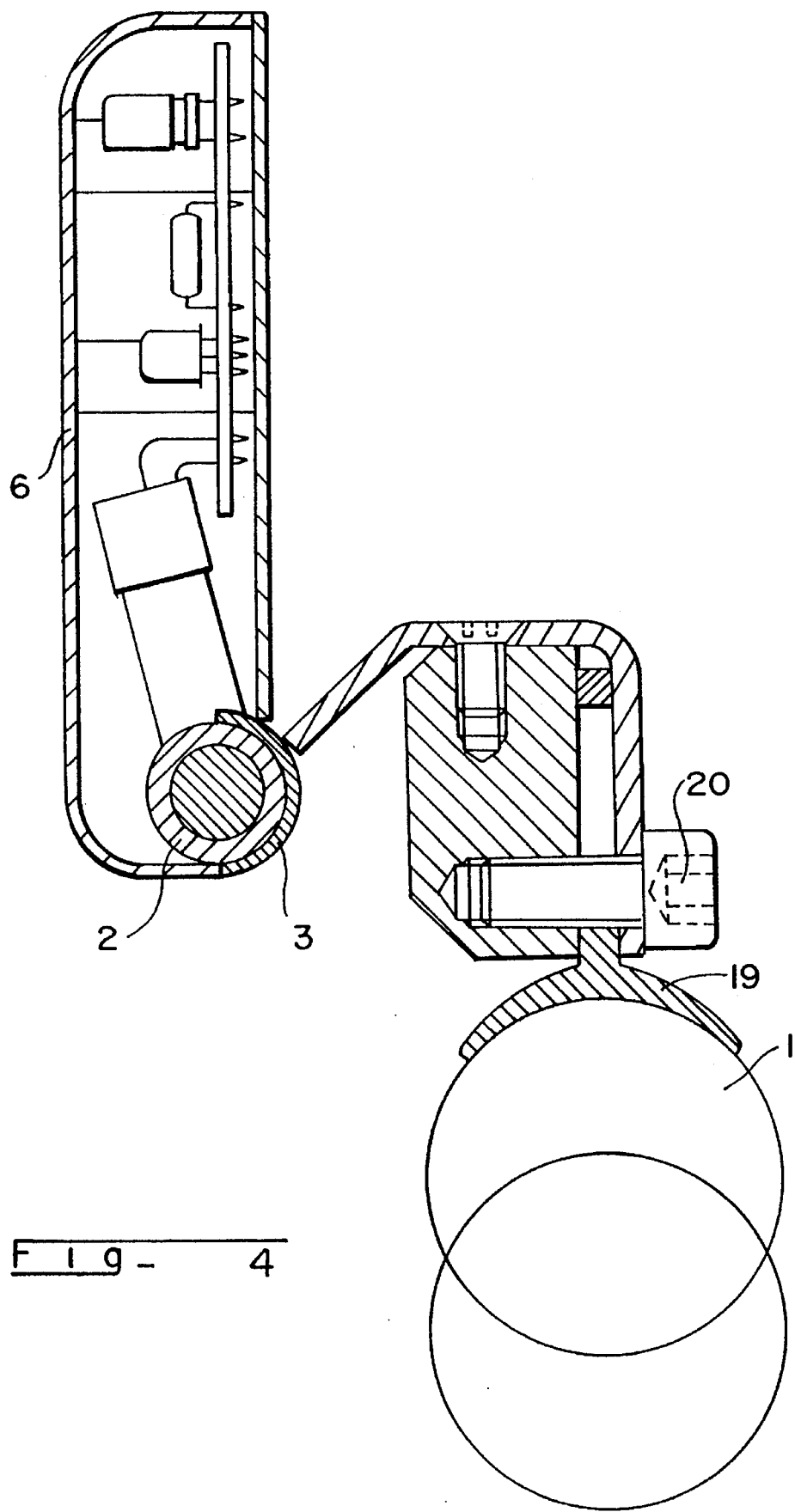
FIG. 4 represents a view along section BB of FIG. 2.
Figure 5:
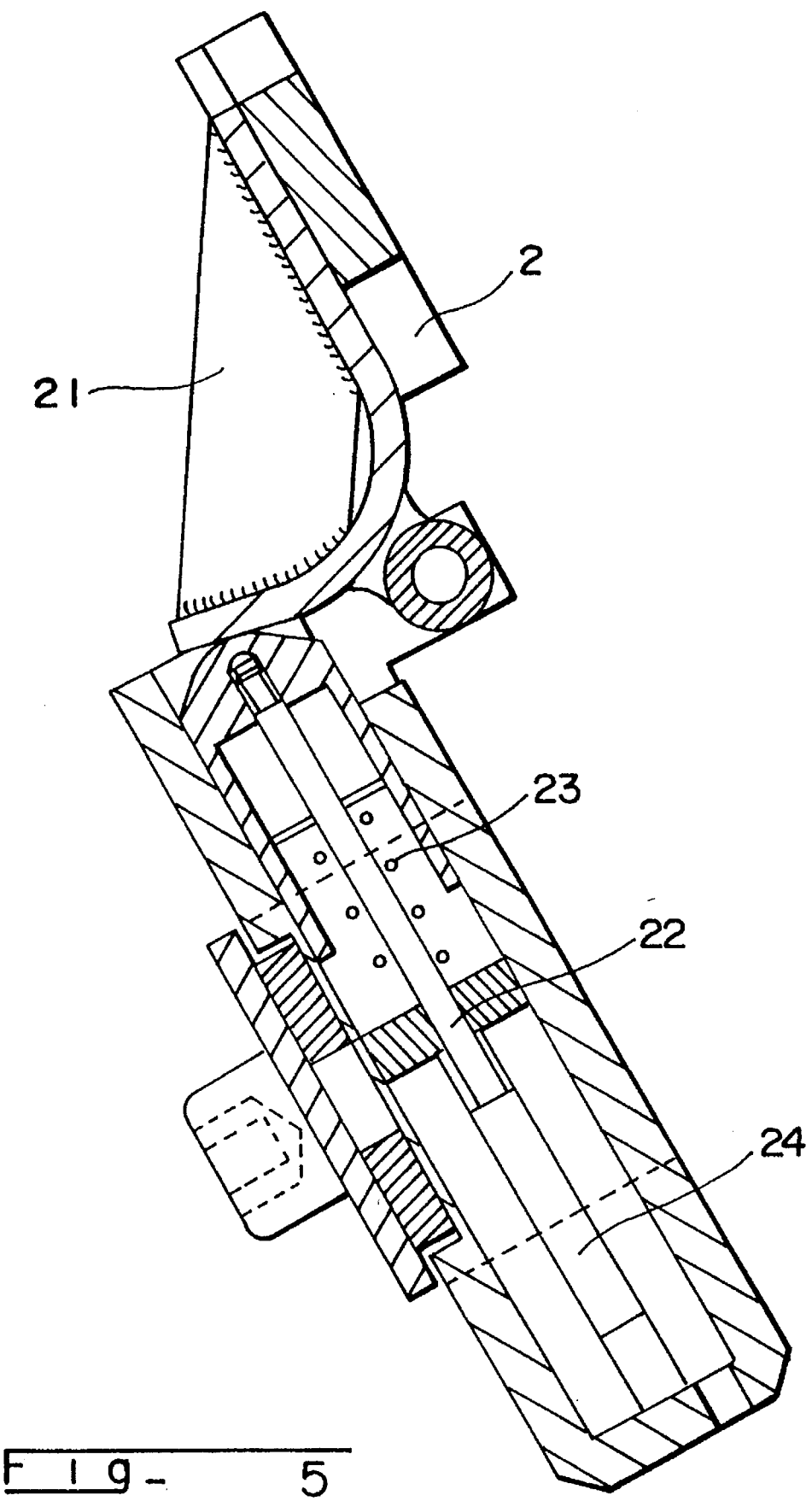

FIG. 5 represents a view along section CC of FIG. 2. This figure shows a journalled pushing device 21 which controls an axis 22 mounted on a double-spring 23. To this end, two concentric springs, one slacker and the other tighter, are mounted on axis 22.

The slack spring is actuated first, followed by the tight spring.

Axis 22 controls a pressure sensor 24 which determines a position of the corresponding motor 8 and therefore of the pedal or the element controlled by said motor.

FIGS. 6 and 7 are sectional views of the protective cover of gear shift lever 10 which receives the clutch and brake controls. This protective cover can be fixed on the gear shift lever or anywhere else in the passenger space that is accessible to the driver.

For safety reasons, it is provided that the connection between controls 11 (clutch and its sensor) and 12 (brake and its sensor) is wired; however, one can envision that it is done by a transmitting-receiving system.

FIG. 6 represents trigger 11 mounted on a rigid spring 25 whose adjustment can be obtained by attachment screw 26. Upon depression, trigger 11 controls pressure sensor 27 by means of an axis 28 with compression spring 29, less tight than spring 25.

The system is designed such that spring 29 is biased before the tighter spring 25.

FIG. 7 represents the pushing device of brake 12 which actuates a pressure sensor 31 by means of an axis 30. A second axis 32, with a spring 33, actuates a jack 18 which receives a return pressure from the master cylinder by means of conduit 17.

The pressure sensors determine the position of the motors 8 which actuate either the pedals or any other operational control element of the vehicle, such as the carburetor control, for example.

Figure 8:
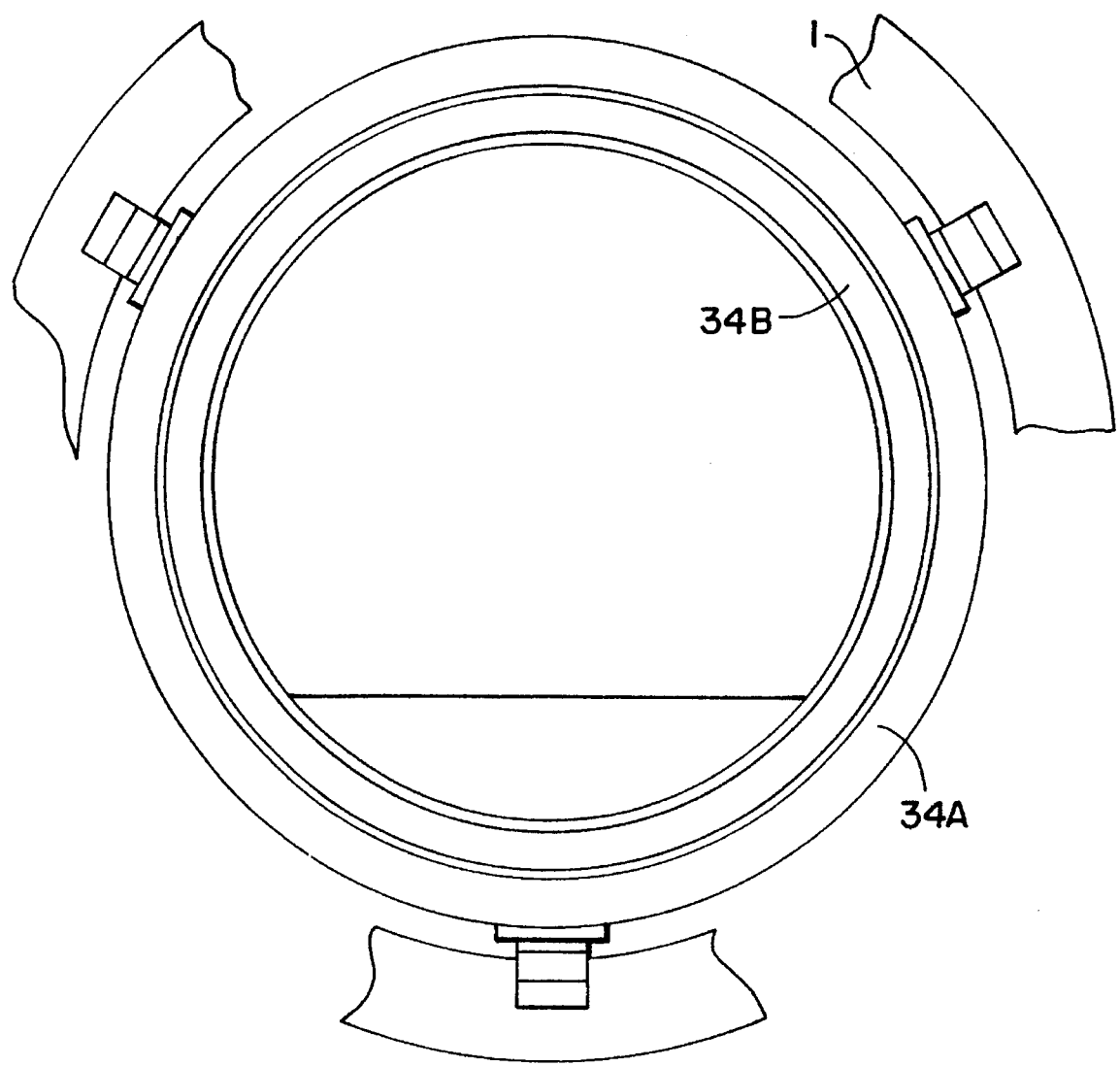
Figure 9:
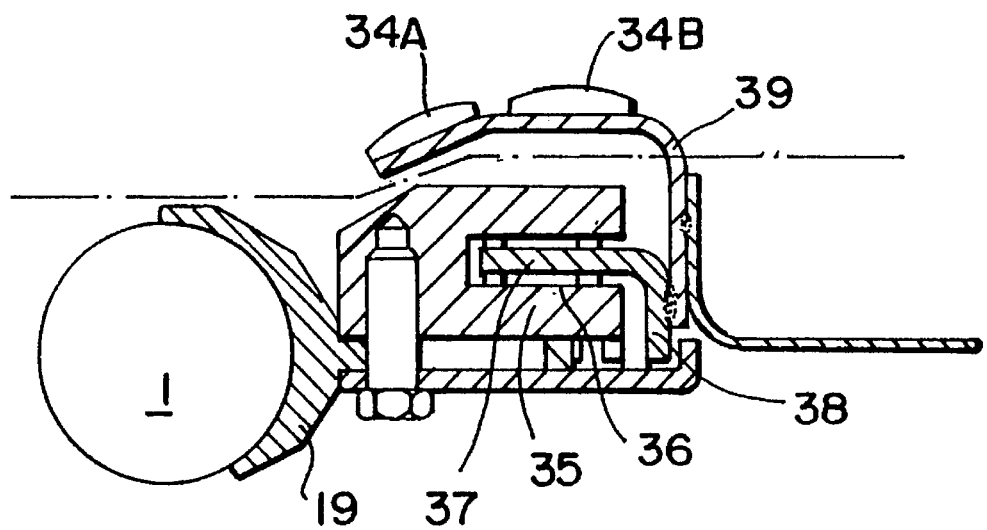
Figure 10:
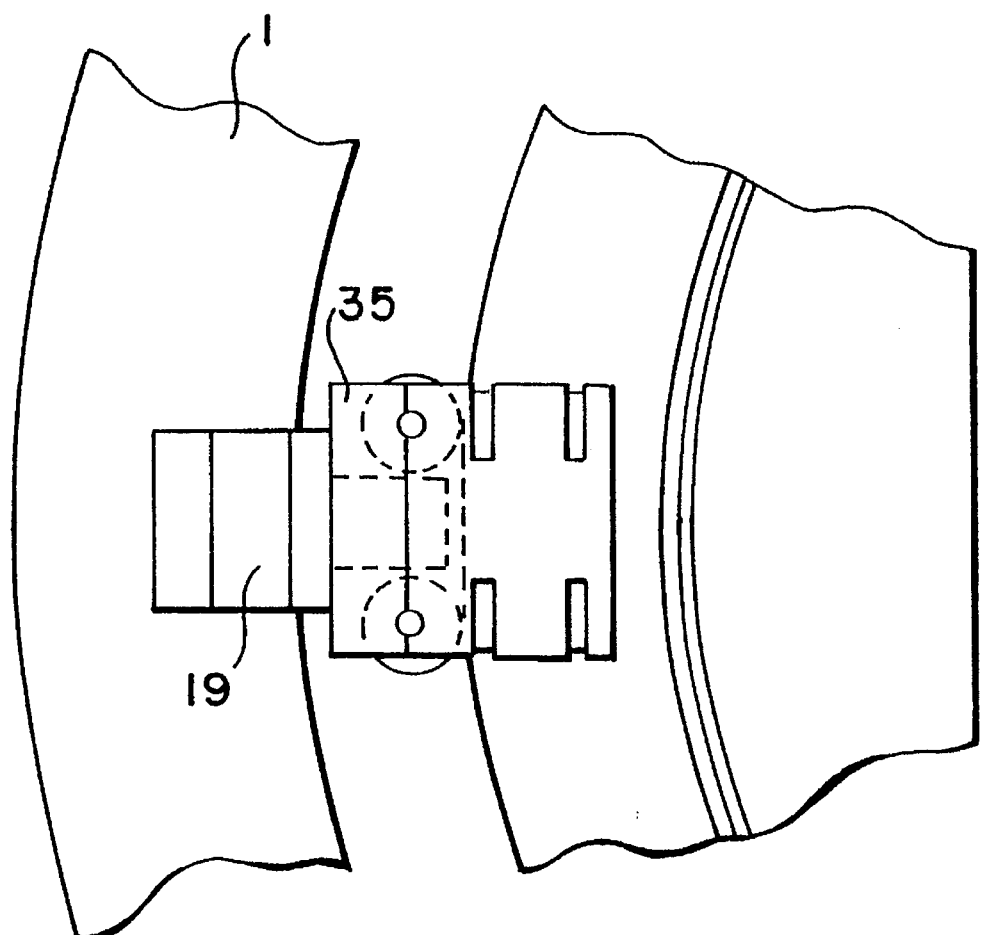

According to an embodiment of the invention represented in FIGS. 8, 9 and 10, steering wheel 1 is provided with a system of concentric annular sensors 34A and B which have a free rotational movement with respect to steering wheel 1; this enables the user to maintain contact with the sensors while turning the steering wheel.

To this end, the mounting of sensors 34A and B, as represented in FIGS. 9 and 10, is as follows: On each support 19 fixed to the steering wheel is fixedly mounted a block 35, provided with a horizontal groove 36 in which the planar portion 37 of a circular corner iron slides.

A support 39, covering block 35 and receiving sensors 34A and 34B, is welded on the vertical portion 38 of the circular corner iron.

Internal sensor 34B controls the brake, and external sensor 34A controls the accelerator. Since the rotational guiding of the hoop bearing the sensors is ensured by the supports at the steering wheel, it is possible to install either as many supports as desired, or to position the supports where desired, to avoid an arm of the steering wheel, for example.

According to another embodiment of the invention represented schematically in FIGS. 11 to 14, the system according to the invention is provided with a pedal assembly protection.

The object of this arrangement is to prevent the invalid driver's feet from going under the pedals and locking them by blocking the action of the aforementioned control systems of such pedals.

The protection system is designed like a fixed or removable obstacle, and preferably movable, which is arranged in front of the pedal assembly during operation of the system, i.e., when the vehicle must be driven by an invalid without direct access to the pedal assembly.

Figure 12:
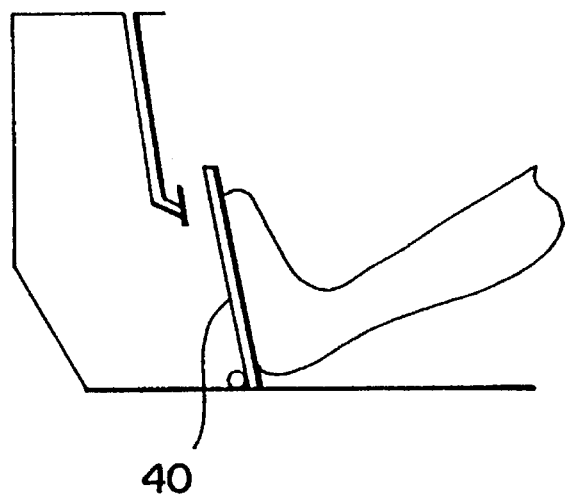
Figure 11:
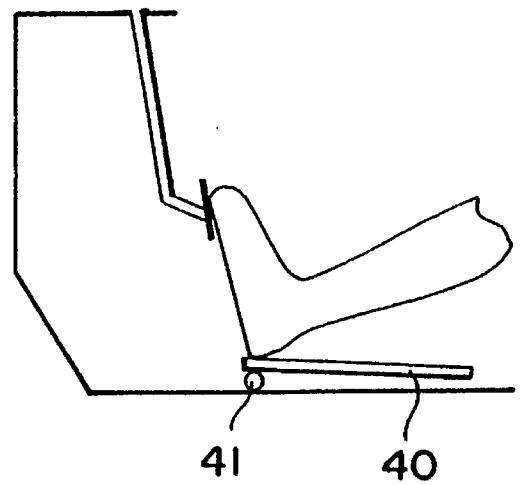
Figure 13:
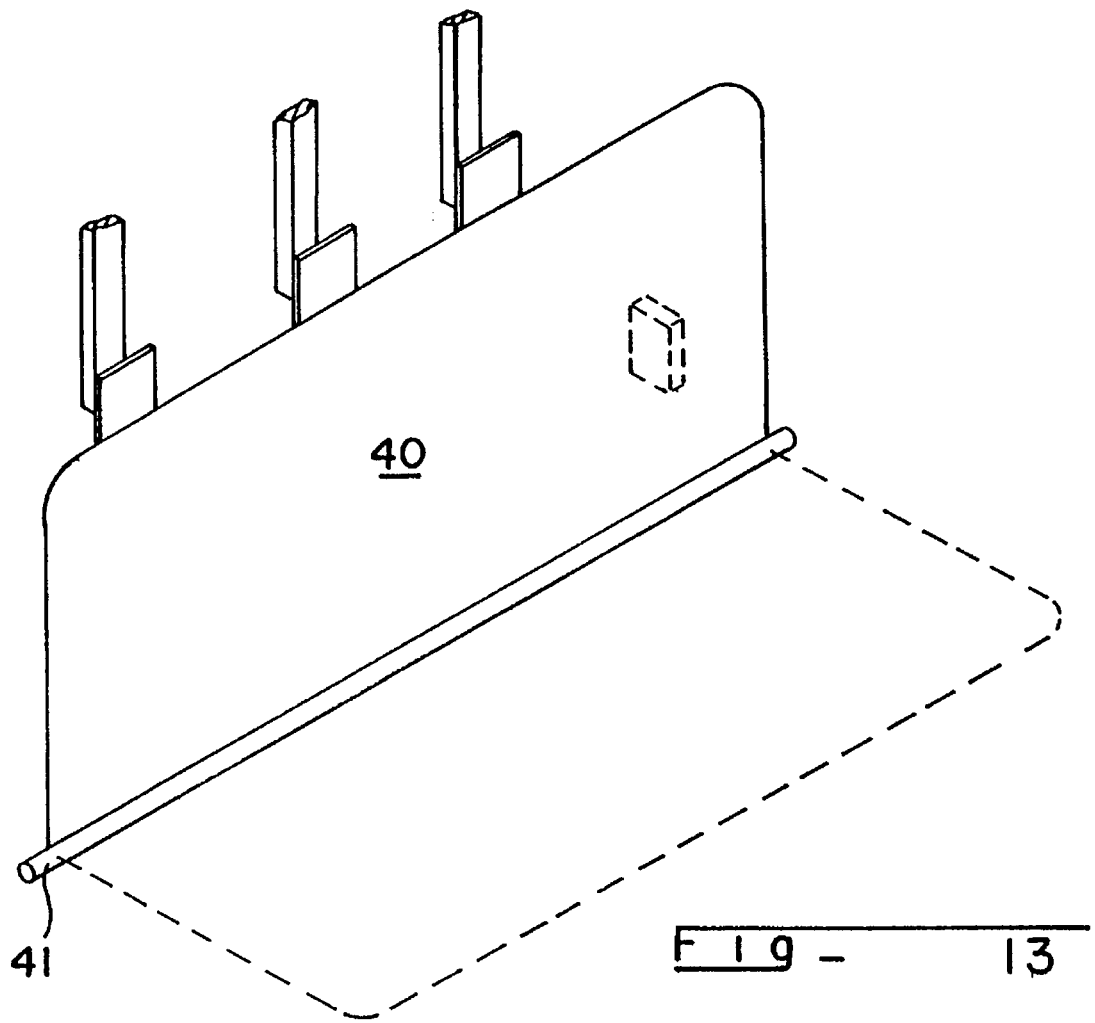

This obstacle is schematically designed like a rigid plate 40 with an adapted or adaptable width, journalled at its base 41 to the floor of the vehicle, and capable of being raised manually or automatically, when the system is turned on, to occupy a vertical or substantially vertical position such as represented in FIGS. 12 and 13.

It is provided that this system can only function when this obstacle position of plate 40 is established.

In the case of a manual positioning, which can be carried out by the user or a companion, a latching and an adjustable abutment system is adapted.

The abutment is then detected by the system which authorizes use of the controls and/or the motors.

Figure 14:
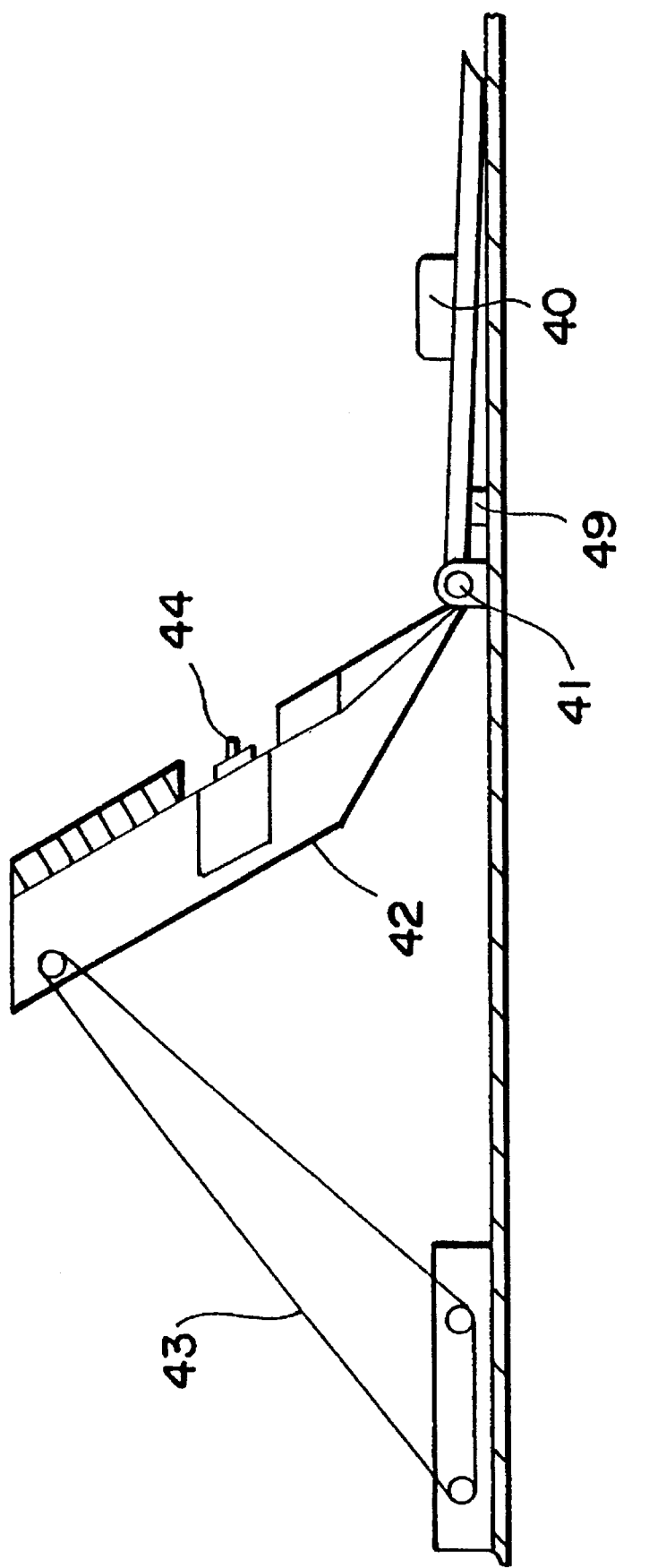

FIG. 14 schematically represents an abutment system. In this system, an abutment 42 journalled at 41, is adjustable in inclination, by a traction cable 43, for example.

On its surface which receives plate 40, abutment 42 is provided with a contact 44 registering the abutment and transmitting the information to the system.

The positioning of obstacle 40 can be carried out automatically by a jack 49 or a motorization, for example, constituted of a deformable parallelepiped, preferably arranged on the right side.

The required energy can be electrical, electromagnetic, pneumatic or hydraulic.

The positioning of obstacle 40 is triggered by switching on the system for example, and as in the manual version, the pedal motors are not activated until after validation of the abutment by detector 44.

A safety device in the automatic version can detect the locking to the ground of wall 40, by the feet for example, and will trigger a visual or oral alarm.

Figure 15:
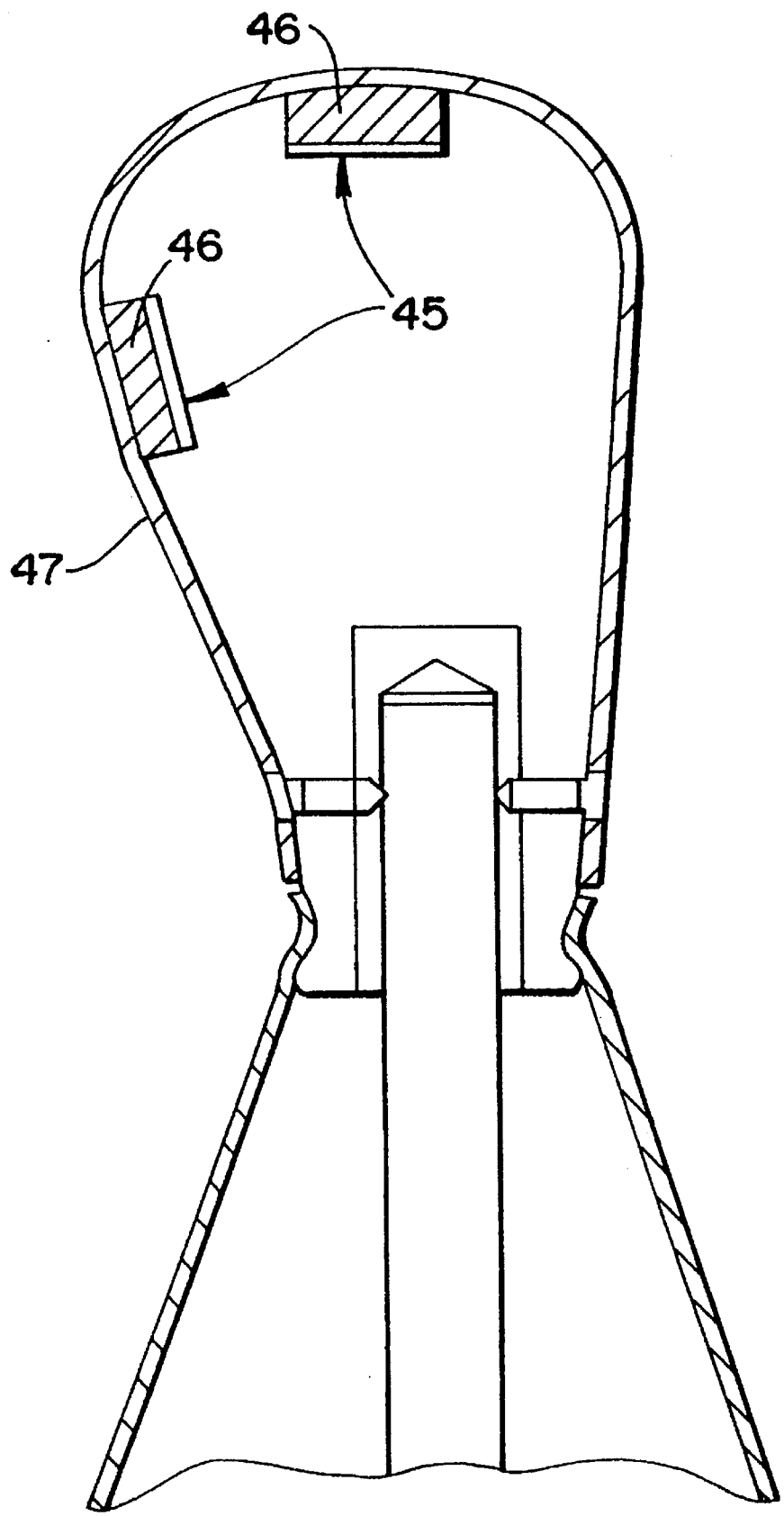

FIG. 15 represents a variation of the embodiment of the controls on the protective cover of the gear shift lever. The protective cover is equipped with two housings:

one on the top, one on the side.

A pressure sensor 45 or the like, of the type mentioned above in the specification, is arranged at the bottom of each of these housings.

One of these sensors 45 is a brake control sensor, the other is a clutch control sensor.

Each of sensors 45 is covered in the corresponding housing by a wedge 46 made of a hard synthetic material such as rubber, for example, so as to have a mechanical stroke.

The protective cover assembly is covered by a flexible covering 47 which locks wedges 46 in position.

We claim:

1. An apparatus including a set of motor vehicle controls for assisting drivers handicapped in the lower limbs, comprising:

a first set of controls on a steering wheel for controlling an accelerator and a brake, a second set of controls, independent of the steering wheel, for controlling a clutch and the brake, a plurality of motors, each motor controlling a one of a pedal of a pedal assembly and a control element of a plurality of control elements, at least one of a wired member and a wire-free member transmitting commands provided by the first set controls on the steering wheel controls, at least one of a wired transmission and a wire-free transmission of commands given by the second set of controls independent of the steering wheel, at least one member for receiving said commands coupled to an electronic unit controlling at least one motor, and transmitting members from each of said at least one motor to a corresponding pedal of the brake, clutch and accelerator.

2. The apparatus according to claim 1, wherein the first set of controls on the steering wheel for the accelerator and the brake comprises:

at least one sensor mounted on the steering wheel to control the accelerator, at least one sensor to control the brake, and at least one radio-transmitting member.

3. The apparatus according to claim 1, wherein the steering wheel is provided with an internal hoop rotating freely with respect to the steering wheel, said hoop bearing two concentric annular sensors one of which is for the brake and the other for the accelerator.

4. The apparatus according to claim 1, wherein the set of motors comprises as many motors as there are pedals in the pedal assembly or elements to control, and wherein each of motors actuates a winch whose cable is connected to the corresponding pedal.

5. The apparatus according to claim 3, wherein each of the motors is servo-controlled into position by electronic unit.

6. The apparatus according to claim 1, wherein the second set of controls for the brake and the clutch is mounted on protective cover of a gear shift lever, wherein it comprises a clutch control member and a brake control member, these control members each actuating a sensor, said controls being connected by wire to electronic unit controlling the motors.

7. The apparatus according to claim 1, wherein the accelerator control of the steering wheel is mounted on an internal hoop of the steering wheel.

8. The apparatus according to claim 1, wherein an actuation value of the steering wheel control sensors determines the accelerator or braking value.

9. The apparatus according to claim 1, wherein the brake controls are provided with a force restitution system which enables the user to feel the braking point.

10. The apparatus according to claim 1, wherein the clutch control is equipped with at least one of a doubly-stiff spring system and a double-spring system enabling the clutch point to be materialized.

11. The apparatus according to claim 1, wherein the brake control is provided with a tightening system upon depression which is connected by a conduit to the master cylinder.

12. The apparatus according to claim 1, said system is provided with a safety device for the pedal assembly.

13. The apparatus according to claim 1, wherein a pedal safety device is constituted by an obstacle in front of the pedal assembly, said obstacle being removable or movable.

14. The apparatus according to claim 12, wherein an obstacle is constituted by a wall journalled at on the floor, and engaging in a vertical or substantially vertical position, manually or automatically, into an abutment position.

15. The apparatus according to claim 12, wherein an abutment of wall enables the system to be switched on.

* * * * *